United States Patent [19]

Cook

[11] Patent Number: 4,914,800
[45] Date of Patent: Apr. 10, 1990

[54] DIFFERENTIAL SIDE QUILL ADJUSTMENT TOOL

[75] Inventor: Michael S. Cook, Waterloo, Iowa
[73] Assignee: Deere & Company, Moline, Ill.
[21] Appl. No.: 143,433
[22] Filed: Jan. 13, 1988
[51] Int. Cl.$^4$ .................. B23P 11/00; B25B 13/46
[52] U.S. Cl. .................. 29/434; 81/57.22; 81/57.32; 81/57.36; 81/125.1; 74/409; 475/246
[58] Field of Search .................. 81/57.32, 57.36, 57.39, 81/57.4, 57.22, 488, 125.1, 77, 58.2; 29/434, 428; 74/409, 710

[56] References Cited

U.S. PATENT DOCUMENTS

| | | | |
|---|---|---|---|
| 599,255 | 2/1898 | Robinson | 81/125.1 |
| 2,574,212 | 11/1951 | Huss | 81/125.1 |
| 2,957,377 | 10/1960 | Hare | 81/63 |
| 4,318,315 | 3/1982 | Washburn | 81/58.2 |
| 4,441,387 | 4/1984 | Hendricks | 81/58.2 X |
| 4,622,870 | 11/1986 | Shirley | 81/58.2 |

FOREIGN PATENT DOCUMENTS 0848333 7/1981 U.S.S.R. .................. 81/57.36

Primary Examiner—D. S. Meislin

[57] ABSTRACT

A tool is provided for adjusting the bearing pre-load and backlash of a differential. The tool has a U-shaped positioning member with an adjustable width base. Bi-directional ratchet heads are provided on the ends of the U, with tools thereon for engaging the side quills of the differential. Setting the ratchets to operate in opposite directions allows easy adjustment of the relative distance between the side quills, and consequently adjustment of the pre-load on the bearings for the differential. Setting the ratchets to operate in the same direction maintains a constant distance between the side quills, but shifts them back and forth in the differential housing, allowing easy adjustment of the backlash between the differential ring gear and the drive shaft pinion gear.

5 Claims, 2 Drawing Sheets

DIFFERENTIAL SIDE QUILL ADJUSTMENT TOOL

BACKGROUND OF THE INVENTION

1. Field of the Invention

The present invention relates to tools for adjusting the position of side quills on a differential.

2. Description of the Related Art

In a conventional differential assembly, bearings, typically roller bearings, are provided to support the differential housing on the wheel drive shafts. Adjustable side quills are provided to pre-load the bearings. These side quills usually are threaded into the differential housing, so they can be screwed in and out of the assembly by rotating the quill. The quills normally are coaxial, so that screwing the guills closer together increases the pre-loading on the bearings, while unscrewing the quills so that they are farther apart reduces the bearing pre-load.

In addition to adjusting the bearing pre-load, such side quills can be used to adjust the backlash between the differential ring gear and the drive shaft pinion gear. To do this, the relative spacing between the side quills is kept constant, but the side quills are screwed in and out of the differential housing by the same amount in the same directions. This shifts the differential ring gear to one side or the other of the housing, which in turn has the effect of adjusting the backlash spacing between the ring gear and the pinion gear.

The adjustable side quills typically have crenellations on their outer edges to aid in adjustment. Conventionally, they are adjusted to positioning a screwdriver, punch or similar tool to engage the crenellations, and then rotating the quills to move them in or out of the differential assembly. Normally, the two quills first are moved relative to one another until they are positioned to provide the proper pre-loading on the bearings. Next, the operator shifts one quill by a certain amount, and then the other quill by the same amount, to shift the entire differential assembly to adjust the backlash. Once the final positioning is obtained, a roll pin is inserted to engage the crenellations in each quill and hold them stationary relative to the housing.

This technique has several disadvantages. Most importantly, if the operator is distracted when he is shifting one quill and then the other to adjust the backlash, the entire process must be started over because the bearing pre-load will no longer be correct. In addition, the operator must constantly switch his screwdriver back and forth between the different crenellations, which is inconvenient and takes time. The overall process is inefficient, and even an experienced factory worker who does nothing but adjust differentials takes 30 to 60 minutes per differential. A typical mechanic in a repair shop in the field who does not do this regularly is more likely to take several hours.

SUMMARY OF THE INVENTION

Accordingly, it is the purpose of the present invention to provide a tool which allows for easy adjustment of both the bearing pre-load and the backlash of a differential. This purpose is accomplished according to the present invention by a tool having two bi-directional ratchet heads with tools thereon to engage the crenellations in the side quills. If the ratchets are set to opposite directions, the bearing pre-load can be adjusted by simply rotating the tool backwards and forwards. If the ratches are set to the same direction, the bearing preload will be maintained while the side quills are shifted from side to side to adjust the backlash. The entire adjustment can be done in just a few minutes.

BRIEF DESCRIPTION OF THE DRAWINGS

The invention will be described below in greater detail with reference to the following figures, in which.

DETAILED DESCRIPTION OF THE PREFERRED EMBODIMENT

Figure 1:
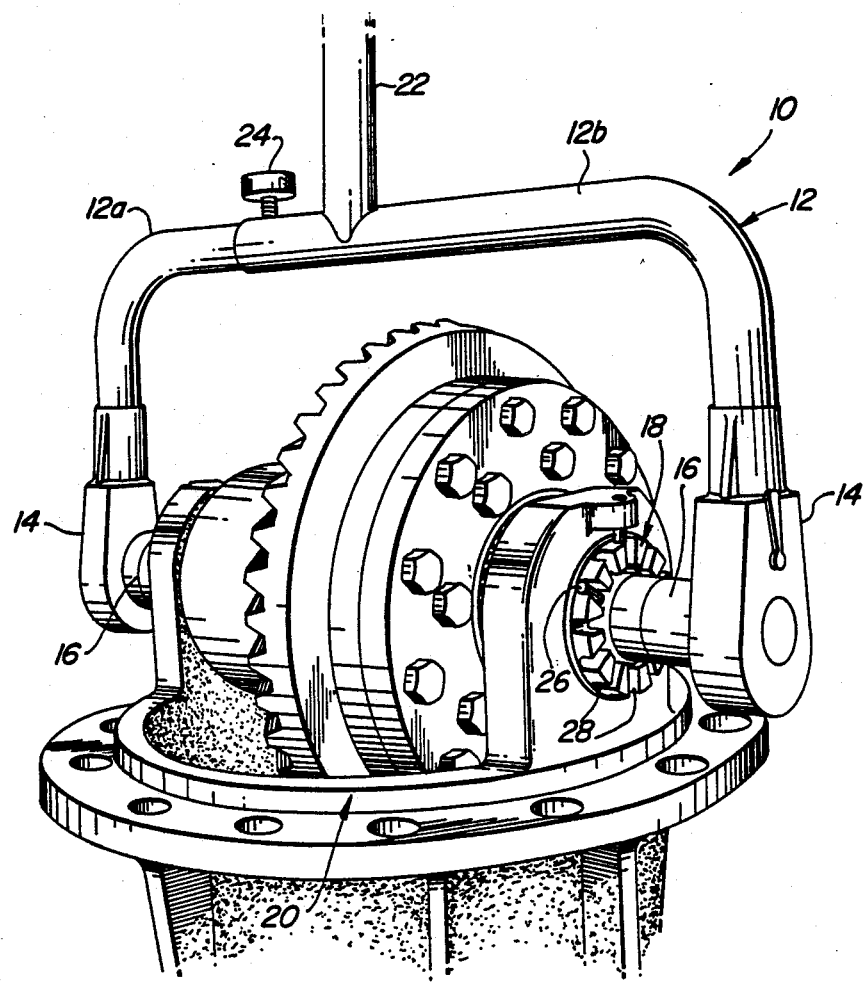
FIG. 1 is a perspective view of the tool according to the present invention, mounted on a differential.

Referring to FIG. 1, the preferred embodiment of the tool 10 has a generally U-shaped positioning member 12. Bi-directional ratchet heads 14 are provided at each end of the U-shaped positioning member 12. A tool head 16 is mounted on each ratchet head 14 and engages the side quill 18 of the differential 20. A handle 22 preferably is provided at the base of the positioning member 12. The positioning member 12 preferably is formd by two telescoping pieces 12a, 12b which can be fixed in position relative to one another, e.g., by a thumb screw 24. Each tool head 16 preferably has at least one rod 26 extending radially therefrom to engage the crenellations 28 in the side quill 18.

Figure 2:
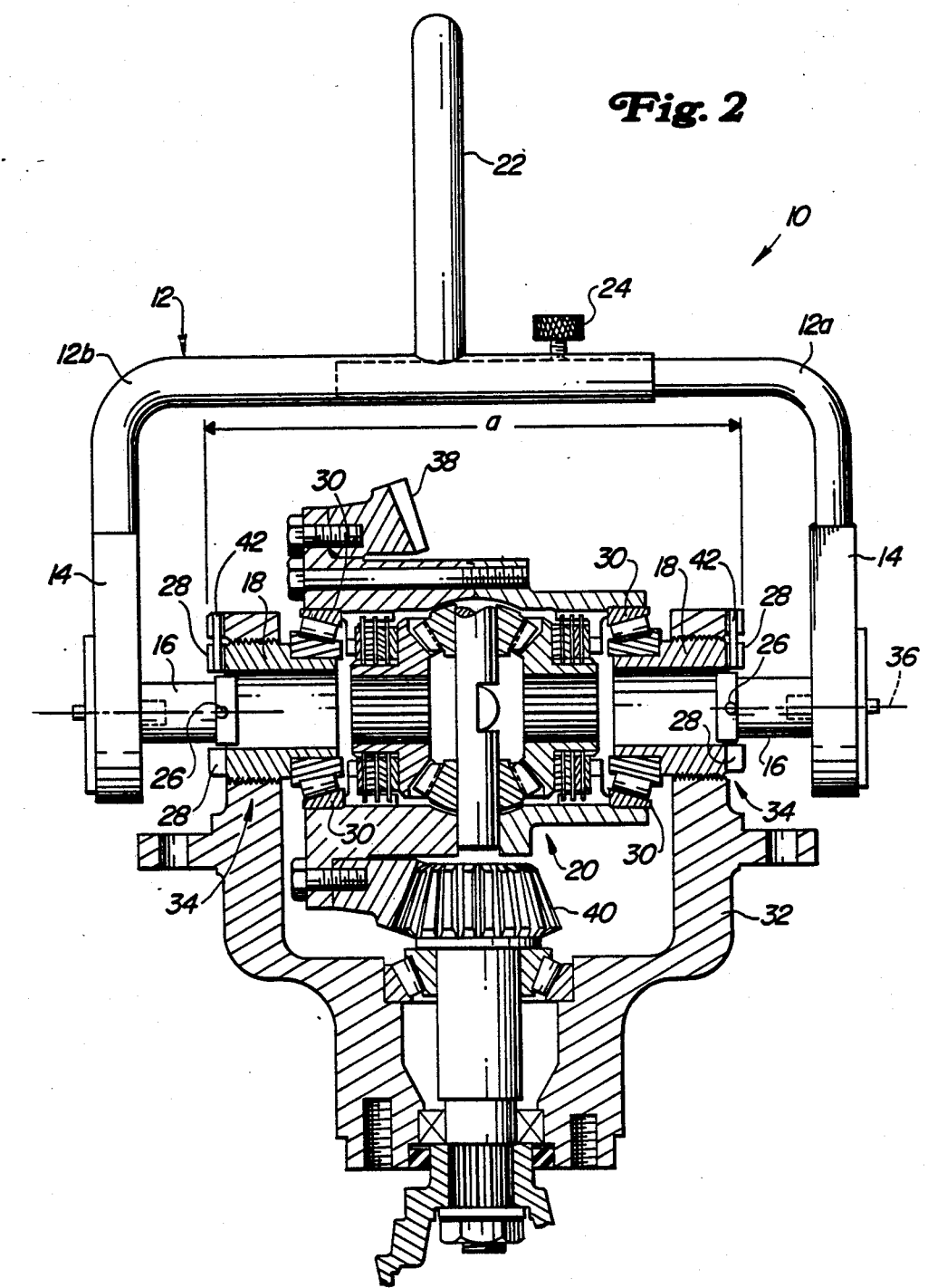
FIG. 2 depicts a plan view of a tool according to the present invention mounted on a differential, which is shown in cross-section for ease of explanation.

Use of the tool 10 according to the present invention will be described in more detail with reference to FIG. 2. In FIG. 2, the tool 10 is shown as it would appear immediately after adjustment of the differential 20. The differential 20 is shown in cross-section for ease of explanation.

The differential 20 is of conventional design, so only the pertinent parts will be described here. The differential 20 is supported by bearings 30 on the adjustable side quills 18. The side quills 18 in turn are supported by a differential housing 32. The position of the side quills 18 is adjustable by means of threads 34 on the side quills 18 and housing 32, so that rotation of a side quill 18 about axis 36 will shift the side quill 18 into or out of the differential housing 32. The differential 20 has an outside ring gear 38 which is driven by the drive shaft pinion gear 40. The pre-load on the bearings 30 is adjusted by adjustment of the relative distance a between the side quills 18. The backlash between the ring gear 38 and the pinion gear 40 is adjusted by shifting of the side quills 18 to the left or right, as seen in the drawing, while maintaining a constant relative distance a between them. Once the final positioning of the side quills is obtained, roll pins 42 are inserted to hold each side quill 18 in position.

To use the tool 10 according to the present invention, the thumb screw 24 on the tool 10 is loosened so that the positioning members 12a, 12b can telescope relative to one another. The tool then is positioned so that the tool heads 16 are adjacent to the side quills 18, and the positioning members 12a, 12b are telescoped together until the tool heads 16 engage the side quills 18. When the tool heads 16 and side quills 18 are fully engaged, the thumb screw 24 is tightened to fix the width of the positioning member 12.

To adjust the pre-load on the bearings 30, the bi-directional ratchet heads 14 are set to ratchet in opposite directions. Initially, the direction which will cause the quills 18 to move closer together normally is chosen. The tool then is rotated back and forth by use of the handle 22, which moves the side quills 18 together until the desired pre-load on the bearings 30 is obtained. If the quills 18 are moved too close together, so that the pre-load is too high, the ratchet settings on the ratchet heads 14 can be reversed. Movement of the tool then will move the quills 18 further apart, reducing the pre-load.

Once the appropriate pre-load is obtained, the ratchet heads 14 are adjusted to ratchet in the same direction. Movement of the tool 10 by the handle 22 then will shift the quills 18 and differential ring gear 38 to the left or right as seen in FIG. 2, depending on the direction chosen for ratcheting. If the quills are moved too far in one direction, the ratchet direction on the ratchets 14 can simply be reversed, and the quills 18 will be shifted back in the opposite direction. The backlash between the ring gear 38 and the pinion gear 40 thus is easily adjusted.

Once the final position is obtained, roll pins 42 are inserted to hold each side quill 18 is position, thumb screw 24 is loosened to allow the positioning members 12a, 12b to spread, and the tool 10 is removed from the differential. As can be seen, the entire operation is quite simple and quick.

While the present invention has been described with reference to a particular preferred embodiment, one of ordinary skill in the art could easily make modifications thereto without exceeding the scope of the present claims. For example, the bidirectional ratchet heads 14 could be replaced by a solid connection between the tool heads 16 and the positioning member 12. This would forego the benefits of the ratchet mechanism, but the tool could still be used. Similarly, the tood heads 16 could be removably attached to the ratchet heads 14 to allow for the use of alternative tool heads with different sized side quills 18. A frictional engagement could be employed instead of the positive engagement provided by the rods 26. In addition, some mechanism other than a thumb screw 24 and telescoping members 12a, 12b could be used to allow changes in the width of the positioning member 12. Accordingly, it is intended that the scope of the present invention be limited only by the following claims.

I claim:

1. A tool for adjusting the positions of two adjustable side quills of a differential assembly, each side quill being adjustable in and out of a differential housing by rotation of the side quill, the tool comprising:
   a substantially U-shaped positioning member having a base portion with a selectively adjustable length and first and second end portions;
   first and second ratchet heads respectively mounted to said first and second positioning member end portions and positioned to ratchet about substantially the same axis, each said ratchet head being individually adjustable to ratchet in either direction, each said ratchet head having at least one rod extending substantially radially from said axis of rotation of said ratchet head, said rod positively engaging the corresponding side quill;
   first and second engagement means mounted to said first and second ratchet heads, each said engagement means being engageable with a corresponding one of said side quills to rotate said side quill.

2. A method for adjusting the drive shaft pinion/ring gear backlash of a differential assembly having two adjustable side quills, each side quill being adjustable in and outer of a differential housing by rotation of the side quill, with a tool comprising:
   engagement means for engaging each side quill to rotate the side quill in either direction;
   positioning means for holding said engagement means in engagement with said side quills, said positioning means being rotatable to rotate said engagement means and said side quills;
   ratchet means for mounting said engagement means to said positioning means, said ratchet means transmitting rotational portion of said positioning means through said engagement means to at least one of said side quills when said positioning means rotates in one direction, but not when it rotates in the other direction, and being adjustable to allow ratcheting in either rotational direction;
   the method comprising:
   engaging the side quills of the differential with the engagement means to the tool;
   adjusting the ratchet means of the tool to ratchet in the same direction; and
   rotating the positioning means to rotate said engagement means and quills, thereby adjusting the backlash by adjusting the position of said quills.

3. A method for adjusting the bearing pre-load of a differential assembly having two adjustable side quills, each side quill being adjustable in and out of a differential housing by rotation of the side quill, with a tool comprising:
   engagement means for engaging each side quill to rotate the side quill in either direction, said engagement means comprising two tool heads, each tool head being engageable with one of said side quills;
   positioning means for holding said engagement means in engagement with said side quills, said positioning means being rotatable to rotate said engagement means and said side quills;
   ratchet means for mounting said engagement means to said positioning means, said ratchet means transmitting rotational motion of said positioning means through said engagement means to at least one of said side quills when said positioning means rotates in one direction, but not when it rotates in the other direction, and being adjustable to allow ratcheting in one direction for both tool heads or in one direction for one tool head and the other direction for the other tool head;
   the method comprising:
   engaging the side quills of the differential with the engagement means of the tool;
   adjusting the ratchet means of the tool to ratchet one tool head in one direction and the other tool head in the other direction; and
   rotating the positioning means to rotate said tool heads and quills relative to one another, thereby adjusting the distance between said quills and the pre-load on the bearings.

4. A tool for adjusting the positions of two adjustable side quills of a differential assembly, each side quill being adjustable in and out of a differential housing by rotation of the side quill, the tool comprising:
   a substantially U-shaped positioning member comprising two L-shaped parts which telescope together to form a base portion with a selectively adjustable length and first and second end portions;
   stop means for selectively holding said adjustable length base at a desired length, said stop means comprising a threaded bore in one of said L-shaped parts and a thumb screw threadedly mounted in said bore and frictionally engageable with the other said L-shaped part;

first and second ratchet heads respectively mounted to said first and second positioning member end portions and positioned to ratchet about substantially the same axis, each said ratchet head being individually adjustable to ratchet in either direction;

first and second engagement means mounted to said first and second ratchet heads, each said engagement means being engageable with a corresponding one of said side quills to rotate said side quill.

5. The tool of claim 4, further comprising handle means attached to the base portion of said positioning member for rotating said positioning member.

* * * * *